July 11, 1950 F. F. KISHLINE 2,515,010
SYNCHRONIZER
Filed June 16, 1945

INVENTOR
FLOYD F. KISHLINE
BY Carl J. Barbee
HIS ATTORNEY

Patented July 11, 1950

2,515,010

UNITED STATES PATENT OFFICE 2,515,010

SYNCHRONIZER

Floyd F. Kishline, Kenosha, Wis., assignor to Nash-Kelvinator Corporation, Kenosha, Wis., a corporation of Maryland Application June 16, 1945, Serial No. 599,385

6 Claims. (Cl. 192—53)

This invention relates to improvements in transmission gearing and more particularly to intermediate speed clutch devices used in automobile transmissions.

It is an object of this invention to provide means whereby the shifting of gears in a transmission will be facilitated.

It is another object of this invention to provide means reducing the amount of manual effort required to shift the gears in an automobile transmission.

It is a further object of this invention to provide means which will efficiently synchronize the speeds of the transmission gears during shifting operations.

Further objects and advantages of this invention will be apparent from a consideration of the following description and the attached drawings, of which there is one sheet, and in which.

Figure 1:
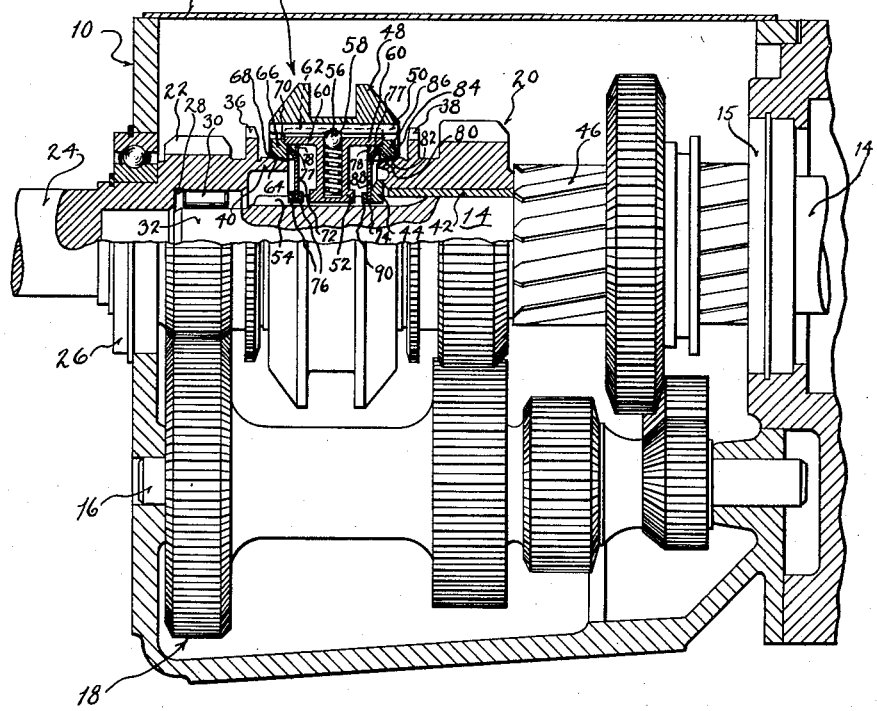
Figure 1 is a side elevation, partially in section, of a power transmission of an automobile.

In Figure 1 is illustrated the conventional type of automotive transmission known to the art at the present time having a case 10 which is secured to the bell clutch housing (not shown). Transmission case 10 is provided with a cover 12 and the transmission within the case 10 consists of a main shaft 14 journaled in a bearing 15 which is secured in the rear wall of case 10 and a countershaft 16 which is fast in the walls of case 10.

Rotatively supported upon the countershaft 16 is the usual countershaft gear cluster generally indicated at 18, the gears of which are in constant mesh with gear 20 which is rotatively supported upon the main shaft 14 and with a gear 22 formed upon the clutch shaft 24 which extends from the bell clutch housing into the transmission case 10. The clutch shaft 24 is journaled in a ball bearing 26 supported in the forward wall of the transmission case 10 and is provided with a hole 28 in its rearward end within which roller bearings 30 are positioned for rotatively supporting the forward end 32 of the main shaft 14.

Generally indicated at 34 is a jaw clutch by means of which the main shaft 14 is selectively connected either directly to the clutch shaft 24 through its high speed clutch teeth 36 for a direct drive connection or to the gear 20 through its intermediate speed gear teeth 38 for a second speed drive through the countershaft gear cluster 18. Gear teeth 36 are cut around the outer surface of flange 40 on the rearward end of clutch shaft 24. Intermediate speed clutch gear teeth 38 are formed on the outer surface of intermediate gear 20 adjacent the jaw clutch 34.

It will be noted that the gear 20 is rotatively supported on the main shaft 14 by a sleeve 42 of bearing material and is held against axial movement forwardly along the shaft 14 by means of a snap ring 44 which is fitted within a groove cut in the main shaft 14. The other side of gear 20 abuts the forward end of the enlarged splined portion 46 of main shaft 14.

The jaw clutch mechanism 34 has an outer collar 48, the inner surface of which is defined by gear teeth 50. The clutch collar 48 is in toothed engagement with a hub member 52 which is in slidable splined engagement with the splined portion 54 of main shaft 14. A plurality of spring pressed balls 56 are mounted about the periphery of the hub 52 and centrally thereof. Said balls are normally adapted to engage in the centrally disposed recesses 58 formed in the surfaces of the teeth 50 and positioned opposite said balls 56. The balls 56, when engaged within recesses 58, resist axial shifting movement of collar 48 over hub 52. Hub 52 has opposite axially extending portions 60 on the outer periphery of which are formed gear teeth 62 which are in constant engagement with gear teeth 50 of collar 48.

Flange 40 of clutch shaft 24 has a flat peripheral surface 64 disposed at an angle from the axis of said clutch shaft 24. Positioned between surface 64 and axially extending portion 60 of hub 52 is a friction cone member 66 which has a flat angular surface 68 designed to engage the surface 64 of flange 40. Cone 66 has an upwardly extending portion 70 abutting the outer end of portion 60.

As collar 48 is shifted forwardly to facilitate engagement between its internal teeth 50 and gear 36, hub 52 will be moved therewith due to the resistance of balls 56, thereby pushing the flat surface 68 into engagement with the surface 64 of clutch shaft 24. The frictional engagement between these two members will tend to synchronize the rotative speeds of the main shaft 14 and said clutch shaft 24, thereby facilitating an easy engagement between the clutch collar 48 and gear 36 to form a direct drive through the transmission.

It has been found that if friction cone 66 is secured to the hub 52, the engagement of cone 66 with surface 64 will cause additional torque to be applied to the forward side of hub 52, thereby slightly cocking it on the main shaft 14, thus making more effort necessary to slide said hub along the splined portion 54 of main shaft 14. In this way the manual effort required to shift the gears to direct drive is increased.

Figure 2:
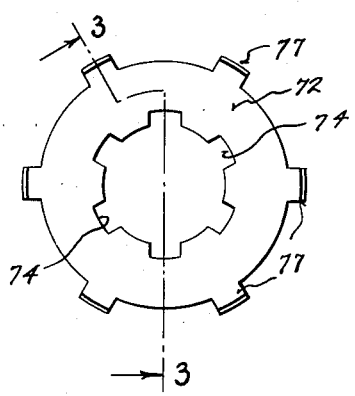
Figure 2 represents a plan view of a friction cone driving disc.
Figure 3:
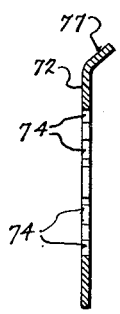
Figure 3 is a sectional view taken on a plane indicated by the line 3—3 of Figure 2 and looking in the direction of the arrows.

To prevent cocking of hub 52 on shaft 14 as described above, the invention provides that friction cone 66 shall be a semi-free floating friction cone positioned between hub 52 and flange 40 and driven by the main shaft 14 through a flat metal disc 72. Disc 72 as shown in Figure 2 is internally splined as at 74 to create a splined engagement between said disc and the splined portion 54 of main shaft 14. Disc 72 is held in position on the portion 54 of shaft 14 by snap rings 76 positioned on either side of disc 72 within a series of grooves in said portion 54 of shaft 14.

From the outer periphery of disc 72 extend a series of slightly axially bent portions 77 of said disc into a series of slots 78 formed in the side of friction cone 66 which is nearer the hub 52. In this manner when the main shaft 14 is rotated, disc 72 will be rotatively driven thereby, carrying friction cone 66 with it.

In a like manner, the speed of main shaft 14 is synchronized with the speed of intermediate gear 20 when the operator wishes to engage clutch collar 48 with intermediate clutch gear 38.

On the forward side of gear 20 is formed a flange 80, on the outer periphery of which is formed a flat angular surface 82 which is designed to engage with the flat angular surface 84 of friction cone 86 which is positioned between the rearwardly extending portion 60 of hub 52 and the surface 82 of gear 20.

A metal disc 88 identical to disc 72 is secured on portion 54 of shaft 14 and held against snap ring 44 by a snap ring 90 secured in grooves on portion 54. Friction cone 86 is driven by shaft 14 through disc 88 with its series of portions 77 in the same manner as described above in regard to friction cone 66 and in this manner the rotative movement of shaft 14 and its clutch collar 48 is synchronized in regard to the rotative speed of clutch shaft 24 and its gear 38 so that engagement of gear 38 by collar 48 may be facilitated.

It will be understood that a dual use of the invention is shown in the drawings and that the invention as shown on either side of hub 52 is independent of the other; i. e., disc 72 and cone 66 do not depend on disc 88 and cone 86 for aid in synchronizing shafts 14 and 24 when collar 48 is moved toward engagement with gear 36. Either of the uses of the invention shown can be used independently of the other.

While I have described my invention in some detail, I intend this description to be an example only and not limiting on my invention, to which I make the following claims:

1. In a transmission synchronizer, a first torque transmitting member, a second torque transmitting member, a synchronizing mechanism therefor comprising a first jaw clutch element drivingly mounted and slidable on said first member, a second jaw clutch element drivingly associated with said second torque transmitting member and designed to be engaged by said first element, an axially free floating friction clutch element adapted to frictionally engage said jaw clutch elements when said first jaw clutch element is moved toward engagement with said second element, a disc-like driving means rigidly secured around said first torque transmitting member for driving said friction clutch element.

2. In a transmission synchronizer, a first torque transmitting member, a second torque transmitting member, a means for synchronizing said members comprising a first jaw clutch element drivingly associated with said first member, a second jaw clutch element drivingly associated with said second member and axially movable thereon into positive engagement with said first jaw clutch element, a semi-free floating friction clutch element for frictionally engaging said jaw clutch elements when said second element is moved to engage said first element, a driving member rigidly secured on said second torque transmitting member, and a lost-motion connection between said driving member and said friction clutch.

3. In a power transmission, a first torque transmitting member, a second torque transmitting member, a means for synchronizing said members comprising a first jaw clutch element drivingly associated with said first member, a second jaw clutch element secured around said second member and axially movable thereon into positive engagement with said first jaw clutch element, a friction clutch element for engaging said jaw clutch elements as said second jaw clutch element is moved toward engagement with said first jaw clutch element, a disc-like driving element for said friction clutch element on said second torque transmitting member and rigidly secured thereto, a series of notches in said friction clutch element, and outwardly extending dogs of said disc-like element extending into said notches to form a semi-free floating driving connection between said disc-like element and said friction clutch element.

4. In a power transmission, a first torque transmitting member, a second torque transmitting member, synchronizer means for said members comprising a first jaw clutch element formed on said first torque transmitting member, a second jaw clutch element drivingly associated with said first member, a third jaw clutch element drivingly positioned around said second torque transmitting member and axially movable thereon into positive engagement with said first or second jaw clutch element, a pair of semi-free floating friction clutch elements, one positioned between said first jaw clutch element and said third jaw clutch element and the other positioned between said second jaw clutch element and said third jaw clutch element to frictionally engage said elements as the third jaw clutch element is moved to engage the first or second jaw clutch element, and a pair of means rigidly secured to said second torque transmitting member, one drivingly associated with each of said friction clutch elements.

5. In a power transmission, a first torque transmitting member, a second torque transmitting member, synchronizer means for said members comprising a first jaw clutch element formed on said first torque transmitting member, a second jaw clutch element drivingly associated with said first member, a third jaw clutch element around said second member drivingly secured thereto and movable thereon into positive engagement with either said first or second jaw clutch element, a pair of semi-free floating friction clutch means, one positioned on either side of said third jaw clutch element between said third element and the first and second jaw clutch elements for engaging said elements as said third element is moved to engage either said first or second element, a pair of disc-like driving members for said friction clutch means rigidly secured on said second torque transmitting member on either side of said third jaw clutch element, and a lost-motion connection between each friction clutch member and the associated driving member.

6. In a power transmission, a drive shaft, a driven shaft, a jaw clutch element formed on said drive shaft, a jaw clutch element drivingly associated with said driven shaft and adapted to be moved into positive engagement with the jaw clutch element of the drive shaft, a semi-free floating friction clutch means positioned between said jaw clutch elements, and a member directly secured to one of said drive or driven shafts and drivingly engaged with said friction clutch means.

FLOYD F. KISHLINE.

REFERENCES CITED

The following references are of record in the file of this patent:

UNITED STATES PATENTS

| Number | Name | Date |
|---|---|---|
| 1,913,162 | Keller | June 6, 1933 |
| 2,022,095 | Thompson | Nov. 26, 1935 |
| 2,043,806 | Murray | June 9, 1936 |
| 2,048,883 | Murray | July 28, 1936 |